United States Patent Office 3,008,352
Patented Nov. 14, 1961

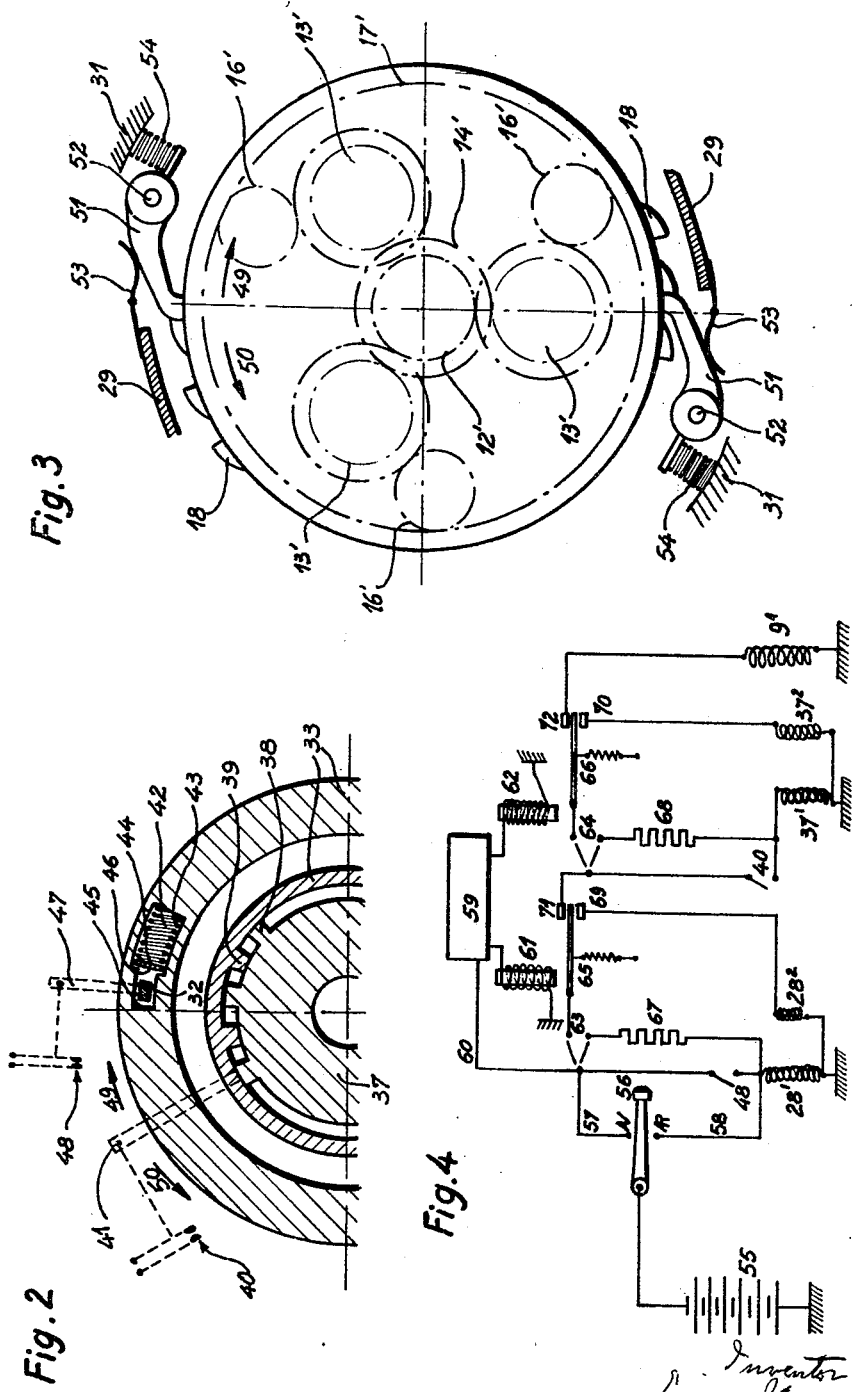

3,008,352
TRANSMISSION MECHANISMS WITH
ELECTROMAGNETIC CLUTCHES
Lucien Péras, Billancourt, France, assignor to Regie Nationale des Usines Renault, Billancourt, France
Filed Feb. 27, 1958, Ser. No. 718,054
Claims priority, application France Mar. 7, 1957
8 Claims. (Cl. 74—732)

The present invention relates in general to transmission mechanisms, particularly for automotive vehicles, and has specific reference to improvements in transmission mechanism or gearboxes wherein the different gear ratios are obtained by actuating electromagnetic holding means or brakes.

In transmissions of this type, in order to reduce the number of sliding contacts for energizing the clutch windings, it is generally attempted to provide the greatest possible number of gear ratios by utilizing holding means adapted to hold or lock rotary members against rotation, the windings of the holding means or brakes being usually carried by the stationary casing; now the obvious solution to this problem is to reduce the gear ratios through epicyclic gearings.

Theoretically, gearboxes of this character are suitable for automatic operation since the change from one gear to another is not effected by alternately putting sliding gear dog-clutches in and out of meshing engagement, but requires only the supply of electric current to different windings, which can easily be accomplished through a governor-controlled device.

However, it is difficult to obtain a proper synchronism between the disconnection of the brake or brakes energized in the preceding gear combination and the engagement of the brake or brakes required to obtain the desired or new gear combination. Since this last-mentioned operation takes place too late or too early with respect to the former, the transmission will either run loose (without load) or suddenly brake the vehicle. The difficulty is still greater if it is desired that the gear changes take place without modifying the engine torque to any appreciable extent.

A known manner of avoiding this disadvantage consists in interposing freewheel devices in the power-geared transmission path. In this case another inconvenience, in addition to the relative fragility of mechanical freewheel, lies in the fact that it is not possible to transmit a negative torque through the gear combination in question, so that the gears cannot be utilized for retarding the vehicle by means of the engine resistance, unless adequate devices are provided for locking the freewheel devices; it is evident that in this case other problems arise from the necessity of properly synchronising the operation of these locking devices.

Another drawback characterizing gearboxes of this character is the very high value of the reaction torque to be absorbed between the stationary casing and the element of the epicyclic gear train which must be held against rotation when the reverse is engaged; this drawback leads to abnormal dimensions and weight of the corresponding electromagnetic brake.

Finally, when the transmission is put in neutral by simply discontinuing the supply of current to all the windings, the epicyclic gear train or trains remaining operatively connected on the one hand to the engine and on the other hand to the wheels of the vehicle, certain component elements of the epicyclic gear train or trains are likely to rotate at abnormal speeds either when the engine is accelerated with the vehicle stationary or when the latter is towed with its engine stopped, for example when it is desired to start the engine in this way.

To avoid these two drawbacks a known solution consists in utilizing electromagnetic brakes for the forward speeds only, the reverse and neutral positions obtaining through a mechanical reversing gear mounted at the output end of the gearbox; it is evident that this solution increases considerably the over-all dimensions of the mechanism.

Now it is the essential object of this invention to provide an improved transmission mechanism comprising at least one automatic clutch followed by a gearbox of the epicyclic train type, this mechanism giving $n$ front drive ratios or speeds and one reverse ratio through a single epicyclic gearing and at the most $n$ electromagnetic brakes of which only one is energized at the same time, one of these brakes being common to both the low or first gear and the reverse. As in hitherto known transmissions cited hereinabove the transmission mechanism according to this invention is particularly adapted for automatic operation due to the exclusive use of electromagnetic brakes for all forward gear combinations.

It is another object of this invention to use a mechanical interlocking device as a substitute for, or a complement to, the electromagnetic interlocking device between two elements whenever this is feasible (without impairing the ease of automatic operation) and advantageous to reduce the number and size of the electromagnetic brakes, that is, on the one hand, for gear shifts from neutral to forward drive and to reverse, which are effected when the vehicle is at a standstill at the driver's will without any intervention of the automatic control system, and on the other hand for absorbing the greater part of the substantial reaction torque developing when the reverse is engaged.

It is another object of this invention to provide a transmission mechanism whereby the proper speed change will take place irrespective of the conditions of operation of the vehicle, without any risk of the transmission running loose or suddenly braking the vehicle, by utilizing special electromagnetic coupling devices giving on the one hand the advantageous features of a mechanical freewheel without the fragility by which this device is usually characterized, and on the other hand the possibility of not only transmitting at will a negative torque irrespective of the gear engaged, but also reducing this torque to a value other than that of the torque transmitted in the positive direction.

According to one embodiment of the present invention, a torque converter of known type is associated with an epicyclic-train gearbox for transmitting the engine torque through the reducing gear combinations, the upper gear combination providing the direct drive combination in which the torque converter is inoperative.

Of course, a hydraulic coupling, a centrifugal clutch or any other known type of automatic clutch may be substitutes for the aforesaid torque converter.

In order to afford a clearer understanding of this invention and of the manner in which the same may be carried out in the practice, reference will now be made to the accompanying drawings forming part of this specification and illustrating diagrammatically by way of example a few typical embodiments of the transmission mechanism according to the invention. In these examples it will be understood that the specific epicyclic gearing already known per se may be replaced by any other known and equivalent epicyclic gearing. In the drawings:

FIG. 2 is a half-section taken on a smaller scale upon a plane I—I at right angles to the longitudinal axis;

FIG. 3 is another section taken upon a plane II—II at right angles to the longitudinal axis;

FIG. 4 is a wiring diagram illustrating a typical automatic system for controlling the gearbox through a known governor.

Figure 1:
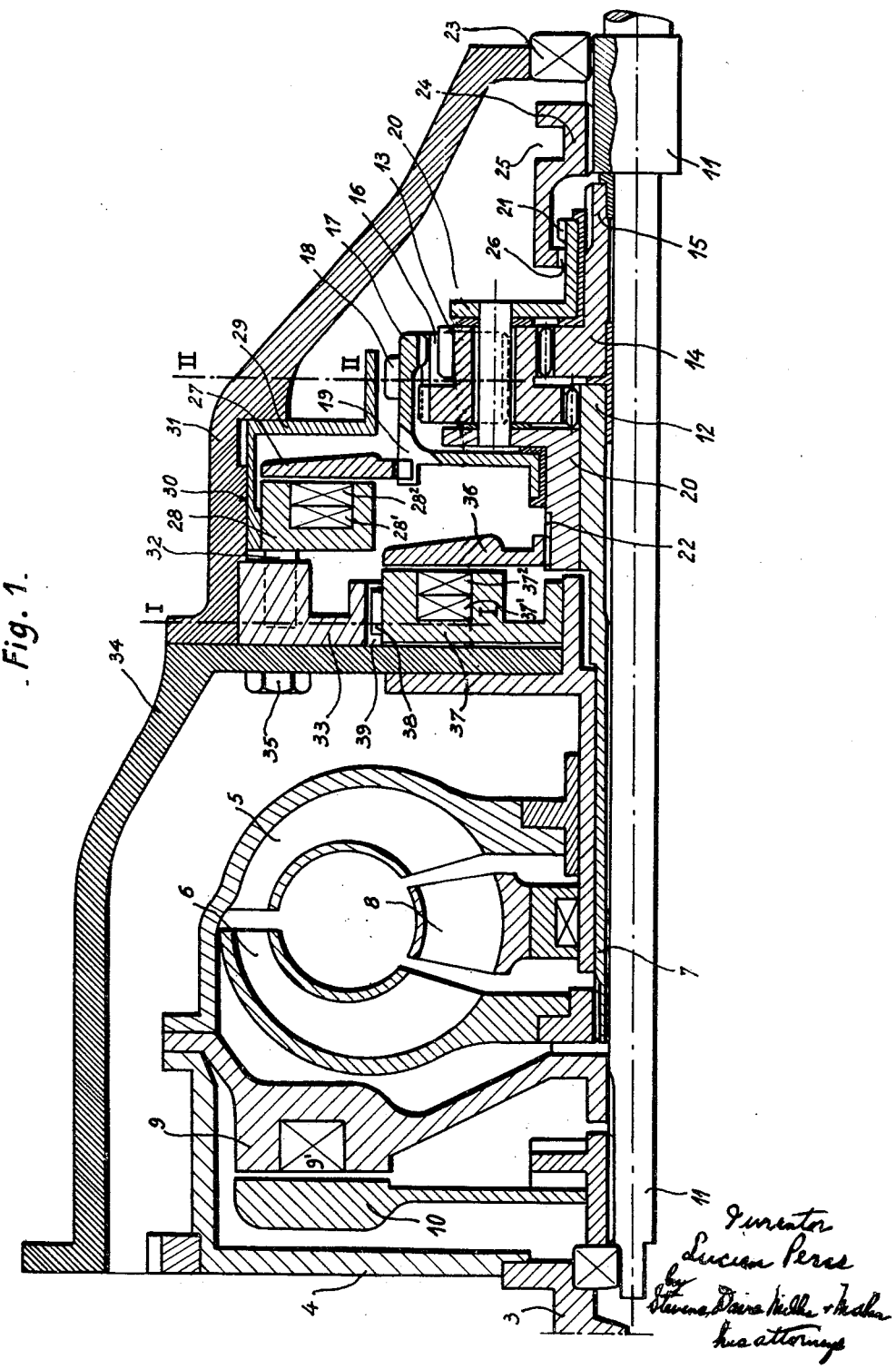
FIG. 1 is a half-longitudinal section showing the typical lay-out of the transmission mechanism.

In the embodiment shown in FIGS. 1 to 4, the input shaft 3 drives a flywheel casing or like bell-shaped casing 4 solid with the impeller 5 of a hydraulic torque converter of known or conventional type. The driven member 6 of this torque converter is mounted through splines on a tubular shaft 7. The reaction member 8 is mounted through a freewheel $8_1$ in the conventional manner on a stationary tubular shaft $8_2$.

The bell-shaped casing 4 has mounted therein a yoke 9 of an electromagnetic brake having an armature 10 in front thereof in the casing. This yoke 9 encloses a toroidal winding $9_1$. The armature 10 is mounted on a central shaft 11 constituting the output shaft of the transmission. The tubular shaft 7 carries on its end opposite to the driven end a sun gear 12 engaging one series of planet pinions or wheels of a double series of stepped planet pinions 13; the other series of planet pinions are in meshing engagement with another sun gear 14 formed with an integral splined tubular stub shaft 15; the first series of planet pinions is also in meshing engagement with angularly-displaced or offset planet pinions 16 (shown in broken lines). These planet pinions 16 are in meshing engagement with an internally-toothed annulus 17 formed with ratchet teeth 18 on its outer cylindrical surface and driving teeth or notches 19 on its edge coincident with the armature 10. The planet carrier assembly 20 (on which the double series of planet pinions 13 and the auxiliary planet pinions 16 are rotatably mounted) consists of a pair of bodies of revolutions interconnected by the pins on which the planet pinions are mounted; these bodies of revolutions are formed on the one hand with teeth 21 (on the output side) and on the other hand with splines 22 (on the input side); besides, they are mounted for loose rotation on shafts 15 and 7, respectively.

The right-hand end of shaft 11 is supported by a bearing 23 fitted in the casing and carries through splines a sliding gear 24 formed with a control groove 25 and an inner set of teeth 26.

This sliding gear 24 is shown in its intermediate position corresponding to the neutral. When it is moved to the left-hand side of FIG. 1 its splines render the output shaft 11 rotatably solid with the tubular shaft 15, thereby giving the forward drive position. When it is moved to the right-hand end, the meshing engagement between its teeth 26 and the teeth 21 of the planet carrier 20 causes the latter to rotate bodily with the output shaft 11, thereby giving the reverse.

Of course, it would not constitute a departure from the principle of this invention to provide a synchronising device, for example a so-called "synchromesh" synchroniser, for completing the meshing engagement between the sliding gear 24 on the one hand and the shaft 15 or the planet carrier 20 on the other hand.

The annulus 17 carries through the medium of the teeth or notches 19 the armature 27 of an electromagnetic brake registering with a yoke member 28 enclosing two toroidal windings $28^1$, $28^2$; this yoke member 28 is secured in a member 29 journalled at 30 in the casing 31 of the transmission mechanism. This member 29 is formed with teeth 32 engaging an annular member 33 secured by screws 35 on the housing 34 surrounding the torque converter.

The splines 22 of the planet carrier 20 drive the armature 36 of an electromagnetic brake having a yoke 37 containing a pair of toroidal windings $37^1$, $37^2$ and carrying a peripheral set of teeth 38 engaging a corresponding set of teeth 39 carried by the stationary member 33 (see FIG. 2).

The purpose of the double windings is to permit a unidirectional operation of the relevant brakes at will. They comprise auxiliary windings pertaining to the same magnetic circuit as the main windings, the two windings being disposed side by side in the same recess. In the case of brakes 28 and 37, the main windings are $28^1$ and $37^1$ respectively, and the auxiliary, smaller windings are $28^2$ and $37^2$.

FIGURE 2 is a cross-sectional view of the transmission mechanism which is taken upon the line I—I of FIG. 1. The teeth 38 and 39, mounted with a certain clearance permitting a slight angular displacement of the yoke 37, are shown diagrammatically. When the yoke 37 is moved it will either close or open an electric contact shown diagrammatically at 40, through the medium of a lever 41 carried along by the yoke 37. The stationary member 33 has a number of apertures such as 42 formed therein; each of these apertures contains a compression spring 43 urging a cross-piece 44 against a narrow end portion of the aperture. This narrow portion is limited at one end by the wall 45 of the aperture and at the opposite end by the face 46 of the cross-piece 44. One of the teeth 32 of the yoke 28 is displaceable in the narrow portion and by virtue of a lever 47 a slight angular movement of the yoke 28 will close or open an electric contact shown diagrammatically at 48.

The forward drive direction is indicated by the arrow 49 and the reverse drive direction by the arrow 50 in FIGS. 2 and 3.

FIGURE 3 is another cross-section taken upon the line II—II of FIG. 1 which illustrates the epicyclic gearing arrangement. The pitch circles of the different pinions and gears are shown in chain-dotted lines; thus, the reference numerals 12', 14', 13', 16' and 17' designates the pitch circles of sun gear 12, sun gear 14, double planet pinions 13, auxiliary planet pinions 16 and annulus 17, respectively.

Pawls 51 may be pivoted on pins 52 carried by the casing 31. These pawls 51 are adapted to lock against rotation in the driving direction the ratchet teeth 18 of annulus 17 (only a few teeth are shown in the drawings). Springs 53 carried by the member 29 are adapted, when this member rotates in the engine direction (see arrow 49) to cause the levers 51 to rotate in the teeth-engaging direction; return springs 54 hold the pawls 51 in their disengaged position when they are not urged by the springs 53.

FIGURE 4 illustrates the wiring diagram of the electrical circuit incorporating the windings $9^1$, $28^1$, $28^2$, $37^1$ and $37^2$, and the switches 40, 48 actuated automatically by the angular movements of the yokes of the relevant brakes in the direction whereby the circuit is either closed when the brake is to be engaged for absorbing the reaction torque of the epicyclic gearing, or open when the reaction takes place in the opposite direction and the brake is to be disengaged.

FIGURE 4 also shows the storage battery 55 of the vehicle, as well as the lever 56 having a "forward" position and "reverse" position; this lever 56 is connected through linkage means (not shown) to the sliding gear 24 and associated with an electric switch whereby, in the neutral position shown in FIG. 4, the battery is disconnected from the other electrical components of the transmission.

When the lever 56 and consequently the sliding gear 24 are placed in the forward-drive position or reverse position, the switch associated with this lever connects the storage battery to conductor 57 or 58, respectively.

The reference numeral 59 of FIG. 4 shows diagrammatically a governor device of any adequate and known type (and shown therefore in block form in this figure) which serves the function of delivering current from the storage battery through conductor 60 either to a relay 61, if the transmission is to give the intermediate or second gear ratio, or to both relays 61 and 62 if the top or third gear ratio is desired, according to the vehicle speed and engine load conditions. The low or first gear ratio is obtained when none of these relays are energized.

Besides, two switches 63, 64 are inserted in the circuit and adapted to be controlled by the driver for a purpose to be defined presently.

In their upper position these switches deliver current from the storage battery 55 through the armatures 65 and 66 of the relevant relays. In their lower position they deliver current across resistors 67, 68 directly to the main windings $28^1$ and $37^1$ of the corresponding clutches.

When windings 61 and 62 are not energized the relay armatures 65 and 66 are returned by adequate springs toward contacts 69 and 70 feeding the pilot windings $28^2$ and $37^2$, respectively.

When windings 61 or 62 are energized, the relay armatures 65 and 66 engage the contacts 71 or 72, respectively.

The operation of the transmission mechanism under running conditions is as follows:

The control lever 56 being in its "forward" position, the sliding gear 24 is moved to the left (FIG. 1) whereby its splines engage the cooperating splines carried by the adjacent end of the tubular shaft 15. The output shaft 11 is thus operatively connected to the sun gear 14. In its extreme upper position the control lever 56 connects the storage battery 55 to conductors 57. As the vehicle is still, the governor 59 will not energize any one of relays 61 or 62. Switches 63, 64 are in their upper position, that is, the normal drive position.

Under these conditions, the auxiliary or pilot winding $28^2$ of the low-gear brake is energized through the circuit comprising conductor 57, switch 63, armature 65 and contact 69. Immediately as an engine torque develops the armature 27 is driven in the reverse direction (see arrow 50, FIG. 2) through the torque converter, shaft 7, planet pinions 13—16, annulus 17 and teeth 19 and through the medium of the brake 28, 27 it causes the tooth or stud 32 to move in the same direction, thereby closing the switch 48 through which the main winding $28^1$ is thus energized. As a consequence of the operation of the electromagnetic brake 27, 28, the annulus 17 of the epicyclic gearing is held against rotation and the drive transmitted through the lowest or first gear ratio that is, through sun gear 12, planet pinion 13 driving the auxiliary planet pinion 16 rolling round inside the annulus 17 held against movement, and also through the sun gear 14 mounted on the output shaft.

When the proper speed and torque conditions for changing up to intermediate or second gear ratio are obtained, the governor 59 energizes the winding of relay 61. The armature 65 of this relay opens contact 69 and closes contact 71. The auxiliary winding $28^2$ of the low speed brake is thus de-energized, but the main winding $28^1$ of this brake is still energized as long as a reaction torque is effective on the annulus 17, as this torque holds the switch 48 closed.

Under these conditions, the auxiliary winding $37^2$ of the second-speed brake is energized through a circuit comprising wire 57, switch 63, armature 65, contact 71, switch 64, armature 66 and contact 70.

The now energized winding $37^2$ is effective to produce a driving torque between the yoke 37 and armature 36 connected to the planet-carrier 20, the latter rotating at this time in the direction opposite to the engine rotation, that is, in the direction of the arrow 50. Thus, the yoke 37 is tilted in the same direction and closes the switch 40 to supply energizing current to the main winding $37^1$ of the intermediate-speed brake through the circuit comprising conductor 57, switch 63, armature 65, contact 71 and switch 40.

The intermediate-speed brake 37 will then develop a retarding torque in the planet-carrier. When this torque attains the value corresponding to the reaction torque of the transmission in the intermediate gear ratio, the brake 28 will no more absorb a reaction torque and will tend to rotate the annulus 17 in the driving direction. This slight angular movement of the yoke 28 in the engine or driving direction opens the contact 48. Thus, the main winding $28^1$ is de-energized and the annulus 17 hitherto held by the armature 27 is released. Consequently, the brake 37 can complete the synchronising and locking of the plant carrier 20. Finally, the drive is transmitted through sun gear 12, planet pinions 13 and sun gear 14 solid with the output shaft.

To shift from intermediate gear ratio to top gear ratio the governor 59 maintains the relay winding 61 energized and energizes at the same time the other relay winding 62. The change-speed procedure is similar to that described hereabove in connection with the change from low gear to intermediate gear ratio, except that the direct-drive brake winding $9^1$ is fed directly with current without the intermediary of any auxiliary winding or switch, whereas the brakes 28 and 37 are de-energized; thus, the output shaft 11 is driven directly from the yoke 9.

To change down from top gear to intermediate gear the governor 59 de-energizes the relay winding 62 and maintains the supply of current to the other relay winding 61. The relay armature 66 opens contact 72 and closes contact 70. The winding $9^1$ is thus de-energized and the transmission of torque is discontinued so that the engine speed of revolution can be increased up to the value corresponding to the intermediate gear ratio. When this value is attained the yoke 37 of the intermediate gear is carried along in the reverse direction under the influence of the auxiliary winding $37^2$ energized since the winding $9^1$ was de-energized, so that the switch 40 is actuated and supplies current to the main winding $37^1$, thereby holding the armature 36 against movement; as the sun gear 20 is rotatably fast with this armature 36, the transmission provides the second or intermediate gear ratio.

From the moment when the governor 59 cuts the supply of energizing current to winding 61, the change from intermediate gear to low gear is substantially similar to that just described; at this time, the winding 37 is de-energized and current is fed to the winding $28^2$.

When the engine speed has attained the value corresponding to the first gear ratio, the yoke 28 responsive to the auxiliary winding $28^2$ moves backwards and actuates the contact 48 to supply energizing current to the main winding $28^1$; the armature 27 and consequently the annulus 17 are thus held against movement.

From the foregoing it will be seen that with the unidirectional operation of the first-gear and second-gear brakes the gear shift from one ratio to another will always take place without any risk of either producing momentarily the simultaneous engagement of two different ratios (which would have the same effect as a sudden, harsh brake application not to mention the serious damages likely to occur in this case) or racing the engine beyond the speed required in the lowest of the two gears considered.

This unidirectional operation of the brakes is also advantageous in that no engine drag or retaining torque can be transmitted in low and intermediate gear ratios, whereas this drag or torque may be highly desirable under certain circumstances, for example when driving downhill with the engine providing additional braking power, or when it is desired to start the engine by towing the vehicle. Nevertheless, the driver has the possibility of obtaining at will the transmission of a retaining torque in the low or intermediate gear ratios by actuating switches 63 or 64, respectively; these switches are so interconnected that only one of them can be set in its low position at a time. Thus, for example, if the driver wants to have the engine retard the vehicle in the intermediate gear position, he actuates the switch 64 to energize the main winding $37^1$ of the second-speed brake through the medium of resistor 68, thus permitting the bidirectional operation of this brake and preventing the energization of the direct-drive brake main winding $9^1$; consequently, the transmission remains automatical in the low and intermediate gear ratios, not in top speed. Besides, by actuating the switch 63 the transmission will operate under bidirectional conditions in the lowest gear ratio alone, not in second and top.

From the above description it will be readily understood that only one electromagnetic brake is energized in each of the gear ratios provided by the transmission mechanism according to this invention.

In reverse, the transmission operates as follows:

The driver sets the control lever 56 in the "reverse" position to move the sliding gear 24 to the right (FIG. 1) and cause the teeth 21 and 26 to engage each other. The output shaft 11 is thus rotatably fast with the planet carrier 20. In its extreme position the control lever switch connects the storage battery 55 to conductor 58, thus energizing the main winding $28^1$ of brake 27—28 common to the low and reverse gear ratios. However, the torque transmission capacity of this brake—designed for absorbing the reaction torque occurring backwards in the low speed ratio—is insufficient to absorb the reaction torque developing forward in reverse, which is considerably greater. In fact, if C denotes the maximum output torque of the torque converter, $r$ the gear ratio of the epicyclic gearing in first or low speed, and $r'$ the gear ratio close to $r$ of the epicyclic gearing in reverse, the reaction torque to which the annulus of the epicyclic gearing is subjected is $C(r-1)$ backwards in forward drive, and $c(r'+1)$ forwards in reverse, this last value being usually two or three times the former.

As one object of this invention is to avoid on the one hand the use of a separate brake or reversing gearing for the reverse drive and on the other hand the excessive dimensions of a brake capable of absorbing the reaction torque developed in reverse-drive conditions, the annulus 17 is locked as explained hereafter to absorb this torque.

When this reaction torque attains a predetermined value definitely lower than the capacity of the electromagnetic brake 27, 28, it causes the yoke 28 to tilt forwards in the direction of the arrow 49 so that the teeth 32 of this yoke will compress the springs 43 through the intermediate cross-pieces 44. During this movement the member 29 connected to the yoke 28 engages the pawls 51 through springs 53, and the pawls 51 are tilted to cause their ends to engage the annulus 17 or the teeth 18 carried thereby. Any pawl 51 prevented from tilting by the engagement of their end with the top of a tooth will remain under the control of the corresponding spring 53.

When the reaction torque attains a value exceeding the capacity of the clutch 27, 28, the annulus 17 rotates forwards in the direction of the arrow 49 through the relatively small angle necessary to cause the teeth 18 to engage the end of pawls 51; from this moment on, these pawls 51 will lock the annulus 17 against rotation until the maximum value of the reaction torque is attained.

When this reaction torque has decreased to a value lower than that exerted by the springs 43 on teeth 32, the assembly comprising the clutch 27, 28, member 29 and annulus 17 will tilt backwards under the influence of springs 32, thus releasing the pawls 51 and allowing them to tilt back due to the action of springs 54.

It must be borne in mind that the embodiment described hereinabove with reference to FIGS. 1–4 of the drawings constitutes but a typical example of the manner in which the invention may be carried out in the practice, and that any known and suitable mechanism for locking the annulus 17 which is equivalent to the device comprising the pawls 51 and controlled by the tilting movement of clutch 27, 28 against the resistance of springs such as 43 would not constitute a departure from the basic principles of this invention.

Although a typical embodiment of the invention has been shown and described herein it will be readily understood by anybody conversant with the art that many modifications and alterations may be brought thereto without departing from the spirit and scope of the invention as set forth in the appended claims.

I claim:

1. In a transmission mechanism having automatic speed control, the combination of a housing, an input shaft, an output shaft, a first tubular shaft coaxial with the output shaft, an electromagnetic coupling having cooperating coupling members, a fly wheel connected to the input shaft, one of said coupling members being operatively associated with the fly wheel, the other of said coupling members being operatively associated with the first tubular shaft, a second tubular shaft coaxial with the output shaft, a hydraulic converter drivingly connected between the fly wheel and the second tubular shaft, an epicycloidal gear train including a sun gear mounted on the second tubular shaft, planetary gears in mesh with said sun gear and an annulus mounted in neutral and a pinion, a gear carrier for the gear train and associated with the pinion, a sliding gear mounted on the output shaft for connecting the output shaft with the first tubular shaft for forward speed and with the pinion for reverse speed, a pair of electromagnetic brakes supported in angularly displaceable fashion by said housing, one of said brakes acting to hold said annulus against rotation, the other of said brakes acting to hold said gear carrier against rotation, means for controlling the angular displacement of said brakes, a circuit breaker for disconnecting the circuit to the windings of the brakes and controlled by the angular displacement and thus assuring an operation as a unidirectional coupling, the arrangement being such that only one of said couplings and electromagnetic brakes is engaged at the same time and a governor device controlling at the same time both the electromagnetic coupling and the electromagnetic brakes.

2. In a transmission mechanism having automatic speed control, the combination of a housing, an input shaft, an output shaft, a first tubular shaft coaxial with the output shaft, an electromagnetic coupling having cooperating coupling members, a fly wheel connected to the input shaft, one of said coupling members being operatively associated with the fly wheel, the other of said coupling members being operatively associated with the first tubular shaft, a second tubular shaft coaxial with the output shaft, a hydraulic converter drivingly connected between the fly wheel and the second tubular shaft, an epicycloidal gear train including a sun gear mounted on the second tubular shaft, planetary gears in mesh with said sun gear and an annulus mounted in neutral and a pinion, a gear carrier for the gear train and associated with the pinion, a sliding gear mounted on the output shaft for connecting the output shaft with the first tubular shaft for forward speed and with the pinion for reverse speed, a pair of electromagnetic brakes supported in angularly displaceable fashion by said housing, one of said brakes acting to hold said annulus against rotation, the other of said brakes acting to hold said gear carrier against rotation, means for controlling the angular displacement of said brakes, a circuit breaker for disconnecting the circuit to the windings of the brakes and controlled by the angular displacement and thus assuring an operation as a unidirectional coupling, the arrangement being such that only one of said couplings and electromagnetic brakes is engaged at the same time and a governor device controlling at the same time both the electromagnetic coupling and the electromagnetic brakes, one of said brakes being common to the reverse and to the lowest forward speed and being designed to absorb the reaction torque of the lowest forward speed whereas in reverse the angular displacement of the brake in the corresponding direction actuates a mechanical locking device adapted to absorb the excess reaction torque developing in reverse with respect to the reaction torque developing in forward drive.

3. A transmission comprising a housing, an input shaft at one end of said housing, an output shaft rotatably journalled in said housing and projecting out of the opposite end thereof, a first tubular shaft coaxial with said output shaft and rotatable relative thereto, a slipping automatic coupling device drivingly connecting said input shaft and said first tubular shaft, an electromagnetic coupling between said input shaft and said output shaft for providing a direct drive between said input shaft and said output shaft, a second tubular shaft coaxial with said output shaft, an epicycloidal gear train coupling said first and second tubular shafts, said gear train including a rotatable carrier and a rotatable internal gear, a slideable connector secured to said output shaft for longitudinal sliding movement, first coupling means on said connector and said second tubular shaft for connecting said second tubular shaft to said output shaft in a forward drive position of said connector, second coupling means on said connector and said carrier for connecting said carrier to said output shaft in a second reverse drive position of said connector, first electromagnetic holding means between said housing and said internal gear to provide a low gear ratio, second electromagnetic holding means between said housing and said carrier to provide an intermediate gear ratio, and control means for automatically controlling the energization of said first and second electromagnetic holding means and said electromagnetic coupling to effect the automatic operation of the transmission.

4. The transmission of claim 3 wherein said first electromagnetic holding means includes an armature connected to said internal gear, a yoke, means mounting said yoke in said housing for limited rotational movement, first and second holding coils carried by said yoke, said control means including a manually operable switch for energizing said first holding coil and a second switch operable by limited rotation of said yoke to energize said second holding coil.

5. The transmission of claim 3 wherein said second electromagnetic holding means includes an armature connected to said carrier, a yoke, means mounting said yoke in said housing for limited rotational movement, first and second holding coils carried by said yoke, said control means including a governor operable switch for energizing for said first holding coil and a second switch operable by limited rotation of said yoke to energize said second holding coil.

6. The transmission of claim 3 wherein said first electromagnetic holding means includes an armature connected to said internal gear, a yoke, means mounting said yoke in said housing for limited rotational movement, first and second holding coils carried by said yoke, said control means including a manually operable switch for energizing said first holding coil and a second switch operable by limited rotation of said yoke to energize said second holding coil, said second electromagnetic holding means including a second armature connected to said carrier, a second yoke, means mounting said second yoke in said housing for limited rotational movement, first and second holding coils carried by said second yoke, said control means including a governor operable switch for de-energizing said first yoke first holding coil and energizing said second yoke first holding coil and to relieve the torque on said first yoke to open said second switch and release said first yoke second holding coil to release said internal gear as said carrier begins to be held, and a third switch operable by limited rotation of said yoke to energize said second yoke second holding coil.

7. The transmission of claim 6 wherein said control means includes a second governor operable switch for energizing said electromagnetic coupling and de-energizing said second yoke first holding coil and to relieve the torque on said second yoke to open said third switch and release said carrier as said electromagnetic coupling is energized.

8. The transmission of claim 3 wherein said second electromagnetic holding means includes an armature connected to said carrier, a yoke, means mounting said yoke in said housing for limited rotational movement, first and second holding coils carried by said yoke, said control means including a governor operable switch for energizing for said first holding coil and a second switch operable by limited rotation of said yoke to energize said second holding coil, a second governor operable switch for energizing said electromagnetic coupling and de-energizing said first holding coil and relieve the torque on said yoke to open said second switch and release said carrier as said electromagnetic coupling is energized.

References Cited in the file of this patent

UNITED STATES PATENTS

| | | |
|---|---|---|
| 2,582,487 | Kelbel | Jan. 15, 1952 |
| 2,588,161 | Probst | Mar. 4, 1952 |
| 2,623,619 | Clark | Dec. 30, 1952 |
| 2,732,732 | Borman | Jan. 31, 1956 |
| 2,759,580 | Bower | Aug. 21, 1956 |
| 2,761,333 | Ravigneaux | Sept. 4, 1956 |
| 2,811,051 | Weymann | Oct. 29, 1957 |